United States Patent
Tsuboi et al.

(10) Patent No.: US 11,951,718 B2
(45) Date of Patent: Apr. 9, 2024

(54) LAMINATE

(71) Applicant: UBE CORPORATION, Ube (JP)

(72) Inventors: Kazutoshi Tsuboi, Ube (JP); Daisuke Douyama, Ube (JP); Hiroaki Fujii, Ube (JP); Takaaki Kusumoto, Ube (JP)

(73) Assignee: UBE CORPORATION, Ube (JP)

( * ) Notice: Subject to any disclaimer, the term of this patent is extended or adjusted under 35 U.S.C. 154(b) by 0 days.

(21) Appl. No.: 17/599,111

(22) PCT Filed: Mar. 27, 2020

(86) PCT No.: PCT/JP2020/014352
§ 371 (c)(1),
(2) Date: Sep. 28, 2021

(87) PCT Pub. No.: WO2020/203905
PCT Pub. Date: Oct. 8, 2020

(65) Prior Publication Data
US 2022/0169000 A1    Jun. 2, 2022

(30) Foreign Application Priority Data

Mar. 29, 2019   (JP) .................................. 2019-068717

(51) Int. Cl.
| | | |
|---|---|---|
| *B32B 27/08* | (2006.01) | |
| *B32B 1/08* | (2006.01) | |
| *B32B 27/22* | (2006.01) | |
| *B32B 27/32* | (2006.01) | |
| *B32B 27/34* | (2006.01) | |
| *C08J 5/18* | (2006.01) | |
| *C08L 23/26* | (2006.01) | |
| *C08L 77/02* | (2006.01) | |
| *F16L 11/04* | (2006.01) | |

(52) U.S. Cl.
CPC ............... *B32B 27/08* (2013.01); *B32B 1/08* (2013.01); *B32B 27/22* (2013.01); *B32B 27/32* (2013.01); *B32B 27/34* (2013.01); *C08J 5/18* (2013.01); *C08L 23/26* (2013.01); *C08L 77/02* (2013.01); *F16L 11/04* (2013.01); *B32B 2250/02* (2013.01); *B32B 2250/24* (2013.01); *B32B 2307/536* (2013.01); *B32B 2307/54* (2013.01); *B32B 2307/558* (2013.01); *B32B 2597/00* (2013.01); *C08J 2323/26* (2013.01); *C08J 2377/02* (2013.01); *C08J 2423/26* (2013.01); *C08L 2203/16* (2013.01); *F16L 2011/047* (2013.01)

(58) Field of Classification Search
CPC .......... B32B 27/08; B32B 1/08; B32B 27/22; B32B 27/32; B32B 27/34; B32B 2250/02; B32B 2250/24; B32B 2307/536; B32B 2307/54; B32B 2307/558; B32B 2597/00; C08L 23/26; C08L 77/02; C08L 2203/16; C08J 2377/02; C08J 2423/26; F16L 11/04
See application file for complete search history.

(56) References Cited

U.S. PATENT DOCUMENTS

| | | |
|---|---|---|
| 5,588,468 A | 12/1996 | Pfleger |
| 2003/0148125 A1 | 8/2003 | Inaba et al. |
| 2003/0157335 A1 | 8/2003 | Inaba et al. |
| 2004/0191440 A1 | 9/2004 | Funaki et al. |
| 2005/0189030 A1 | 9/2005 | Katayama et al. |
| 2006/0083884 A1 | 4/2006 | Cheng |
| 2007/0148388 A1 | 8/2007 | Kuhmann et al. |
| 2010/0047416 A1 | 2/2010 | Oblotzki et al. |
| 2011/0027511 A1 | 2/2011 | Kuriu et al. |
| 2013/0061974 A1 | 3/2013 | Oyaizu et al. |
| 2016/0207292 A1 | 7/2016 | Sato et al. |
| 2016/0214343 A1 | 7/2016 | Nakamura et al. |

(Continued)

FOREIGN PATENT DOCUMENTS

| | | |
|---|---|---|
| CN | 109311259 A1 | 2/2019 |
| EP | 3 042 758 A1 | 7/2016 |

(Continued)

OTHER PUBLICATIONS

English machine translation for JP2016130273. (Year: 2016).*

(Continued)

*Primary Examiner* — Michael C Miggins
(74) *Attorney, Agent, or Firm* — Birch, Stewart, Kolasch & Birch, LLP

(57) ABSTRACT

Provided is a laminate that has excellent low-temperature impact resistance and bursting pressure strength at high temperatures despite having a thick modified polyolefin layer. The laminate has two or more layers including an (a) layer and a (b) layer, the (a) layer includes an aliphatic polyamide composition (A), and the (b) layer includes a modified polyolefin (B). The modified polyolefin (B) includes a unit derived from a monomer based on an α-olefin having 2-10 carbon atoms, and a unit derived from an unsaturated compound having at least one functional group selected from the group consisting of: unsaturated compounds having at least one group selected from the group consisting of a carboxyl group, a hydroxyl group, an epoxy group, an amino group, an amide group, an imide group, a nitrile group, a thiol group, and an isocyanate group; and derivatives of unsaturated compounds having a carboxyl group. The Shore hardness (D scale) of the modified polyolefin (B) as measured according to ASTM D2240 is 30-61.

16 Claims, No Drawings

(56) References Cited

U.S. PATENT DOCUMENTS

| | | | |
|---|---|---|---|
| 2019/0091962 A1 | 3/2019 | Kurumiya et al. | |
| 2021/0078283 A1 | 3/2021 | Tsuboi et al. | |
| 2021/0139699 A1 | 5/2021 | Miki et al. | |

FOREIGN PATENT DOCUMENTS

| | | |
|---|---|---|
| EP | 3 742 033 A1 | 11/2020 |
| JP | 7-214847 A | 8/1995 |
| JP | 9-29869 A | 2/1997 |
| JP | 2004-285905 A | 10/2004 |
| JP | 2004-301247 A | 10/2004 |
| JP | 2005-216725 A | 8/2005 |
| JP | 2006-116966 A | 5/2006 |
| JP | 2008-507436 A | 3/2008 |
| JP | 2009-45793 A | 3/2009 |
| JP | 2012-82885 A | 4/2012 |
| JP | 2014-162080 A | 9/2014 |
| JP | 2017-116048 A | 6/2017 |
| JP | 2020-32588 A | 3/2020 |
| WO | WO 01/58686 A1 | 8/2001 |
| WO | WO 01/60606 A1 | 8/2001 |
| WO | WO 2008/040468 A1 | 4/2008 |
| WO | WO 2009/123027 A1 | 10/2009 |
| WO | WO 2019/054109 A1 | 3/2019 |

OTHER PUBLICATIONS

International Search Report, issued in PCT/JP2020/014352, dated Jun. 16, 2020.
Chinese Office Action and Search Report for corresponding Chinese Application No. 202080025790.2, dated Oct. 25, 2022, with English translation.
Extended European Search Report for corresponding European Application No. 20784663.5, dated Oct. 17, 2022.

\* cited by examiner

LAMINATE

TECHNICAL FIELD

The present invention relates to a laminate.

BACKGROUND ART

Many hoses and tubes are used for various kinds of pressure tubes such as oil pressure tubes, water pressure tubes, etc., vacuum tubes, and fuel piping tubes, brake tubes, hoses for coolant, air conditioner piping tubes, SCR (diesel engine exhaust gas removal apparatus) tubes, control cable liners, etc., used for automobiles. In these hoses and tubes, chemical solutions such as coolants (alcohol and water), refrigerants, oil, urea solutions, etc., are conveyed therethrough. Various kinds of hoses, tubes, etc., used in the automobile industry field are required to have extremely high performance such as high bursting pressure strength under high temperature, heat resistance for a long term, chemical resistance, water vapor and chemical solution barrier properties, flexibility, etc.

In particular, in the case where the circulating fluid is a coolant (LLC) mainly composed of ethylene glycol for preventing from freezing in winter season; a urea solution to be enclosed as a catalyst for removing NOx released from diesel engines; a refrigerant, such as carbon dioxide, freon, alternative freon, propane, water, etc., used for an air conditioner, a radiator, etc.; or the like, if the barrier property to these chemical solutions is not sufficient, the cooling effect or the effect of catalytic function cannot be sufficiently exhibited at the time of practical use. In addition, due to tightening of regulations on the evaporation of ozone layer depleting gas, the demand for the refrigerant barrier property of the tubes for transporting the refrigerant used in automobiles, etc., is becoming stricter.

On the other hand, due to tightening of regulations on the evaporation of ozone layer depleting gas, in recent years, the quality of refrigerants used in automobile, etc., has been improved. For example, R-1234yf refrigerant is a material developed as an alternative refrigerant of HFC-134a refrigerant, and it has lower ozone depleting potential and global warming potential as compared with HFC-134a refrigerant, and is a refrigerant extremely friendly to the global environment. However, in particular, the R-1234yf refrigerant tends to hydrolyze by contact with water under high temperature environment to easily generate an acid (formic acid, etc.), and due to the acid, some materials in contact with a chemical solution are susceptible to hydrolysis or deterioration, and in the worst case, cracks occur and there is a problem that a fluid leaks so that the purpose of transporting the fluid cannot be achieved. Or else, there is sometimes cases where a chemical solution or water permeates through the tube body to adversely affect parts which come into contact with the chemical solution or water.

A single layer tube using solely a polyamide-based resin conventionally used, in particular, polyamide 11 or polyamide 12 excellent in strength, toughness, chemical resistance, flexibility, etc., is not sufficient in long-term durability and barrier property to the chemical solution.

Fluorine-based resins such as an ethylene/tetrafluoroethylene copolymer (ETFE) are markedly excellent in resistance to various chemical solutions, and are considered as one of the material members having barrier property to water vapor. In recent years, development of fluorine-based resins having adhesiveness to a polyamide has been active (see Patent Literatures 1 to 3). However, there are problems that use of halogen-containing materials is being avoided due to environmental correspondence, and they have high specific gravity and high cost, so that development of a piping system which uses halogen-free materials, has excellent barrier property to chemical solutions, and has resistance to various chemical solutions is being demanded.

On the other hand, polyolefins are inexpensive, and excellent in chemical solution-permeating preventive property and long-term resistance to chemical solutions. For example, a piping for cooling constituted by an outer layer comprising a polyamide and an inner layer comprising a cross-linked polyethylene has been proposed (see Patent Literature 4). Also, a piping for cooling constituted by an outer layer comprising a polyamide and an inner layer having a certain thickness or more and comprising a polypropylene which contains a specific additive has been proposed (see Patent Literature 5). Similarly, it has been proposed a piping for cooling which comprises an inner layer which is inactive to a coolant and impossible to swell, and an outer layer comprising a polyamide, wherein the inner layer is constituted by a halogenated or non-halogenated homopolyolefin or copolyolefin, wherein the piping is produced by an extrusion blow molding, wherein the wall thicknesses of the layers differ over the length of a conduit, and the polymers of the inner layer and the outer layer are clearly different in their flexibility (see Patent Literature 6). Also, it has been proposed a multi-layer tube which comprises, from the inside toward the outside, an inner layer of a polyolefin, a first intermediate layer based on an adhesive, a second intermediate layer of an ethylene/vinyl alcohol copolymer, a third intermediate layer of a polyamide and an outside protective layer (see Patent Literature 7). Further, it has been proposed a piping for a fuel cell which comprises a material for an outer layer containing a polyamide-based resin and a styrene-isobutylene block copolymer as essential components as an outer layer, and a material for an inner layer containing a polyolefin-based resin and a styrene-isobutylene block copolymer as essential components as an inner layer (see Patent Literature 8).

CITATION LIST

Patent Literature

Patent Literature 1: WO 2001/058686A
Patent Literature 2: WO 2001/060606A
Patent Literature 3: JP 2004-301247A
Patent Literature 4: JP Hei. 9-29869A
Patent Literature 5: JP 2008-507436A
Patent Literature 6: JP Hei. 7-214647A
Patent Literature 7: JP 2006-116966A
Patent Literature 8: JP 2005-216725A

SUMMARY OF INVENTION

Technical Problem

It has been required that the thicknesses of the polyamide layer and the polyolefin layer can be changed according to the requirements at the time of use, and the resultant piping shows excellent mechanical characteristics at high temperature and low temperature with any layer thicknesses.

However, in the piping disclosed in Patent Literature 4, when a polyethylene is used as an inner layer, long-term resistance at high temperature and physical properties of the tube are inferior.

Also, as the polyolefin layer becomes thicker, it becomes difficult to achieve mechanical strength at both high temperature and low temperature, but in Patent Literatures 5 to 8, there is neither specific technical data nor technical suggestions.

In particular, it has been required to further improve the barrier property to LLC and high temperature resistance in electric vehicles, etc., and it has been required to have excellent barrier property and high temperature resistance and to make a thickness of an inexpensive polyolefin thick in the laminate, and furthermore, both high pressure resistance capable of withstanding an internal pressure of LLC under high temperature atmosphere and impact resistance at a low temperature are required to be established.

An object of the present invention is to solve the above-mentioned problems and to provide a laminate having excellent low temperature impact resistance and bursting pressure strength at the time of high temperature even when it has the constitution in which the layer of the modified polyolefin is thick.

Solution to Problem

The present inventors have intensively studied to solve the above-mentioned problems, and as a result, have found that a laminate having a layer containing an aliphatic polyamide resin composition and a layer containing a modified polyolefin having specific mechanical properties and material properties is excellent in low temperature impact resistance and bursting pressure strength at the time of high temperature even when it has the constitution in which the layer of the above-mentioned modified polyolefin is thick.

That is, the present invention is directed to a laminate having two or more layers comprising Layer (a) and Layer (b), the above-mentioned Layer (a) contains an aliphatic polyamide composition (A), the above-mentioned Layer (b) contains a modified polyolefin (B), the above-mentioned modified polyolefin (B) contains a unit derived from a monomer based on an α-olefin having 2 or more and 10 or less carbon atoms, and a unit derived from an unsaturated compound having at least one functional group, the unsaturated compound is selected from the group consisting of unsaturated compounds having at least one group selected from the group consisting of a carboxyl group, a hydroxyl group, an epoxy group, an amino group, an amide group, an imide group, a nitrile group, a thiol group and an isocyanate group; and derivatives of unsaturated compounds having a carboxyl group, and the above-mentioned modified polyolefin (B) has a Shore hardness (D scale) measured in accordance with ASTM D2240 of 30 or more and 61 or less.

Preferred embodiments of the laminate are shown below. A plurality of the preferred embodiments can be combined.

[1] The laminate wherein the above-mentioned aliphatic polyamide composition (A) contains a polyamide (A1), and the above-mentioned polyamide (A1) is an aliphatic polyamide having a ratio of a number of methylene groups to a number of amide groups of 7.0 or more.

[2] The laminate wherein the above-mentioned polyamide (A1) is at least one homopolymer selected from the group consisting of polyamide 11, polyamide 12, polyamide 610, polyamide 612, polyamide 1010, polyamide 1012 and polyamide 1212, and/or at least one copolymer using several of raw material monomers forming these.

[3] The laminate wherein the above-mentioned aliphatic polyamide composition (A) contains one or more further components selected from the group consisting of a plasticizer, an impact resistant agent and a heat resistant agent.

[4] The laminate wherein the above-mentioned Layer (a) and Layer (b) are adjacent to each other.

[5] The laminate wherein the above-mentioned modified polyolefin (B) has a tensile yield point stress measured in accordance with ASTM D638 of 23 MPa or less, and a tensile break point stress measured in accordance with ASTM D638 of 25 MPa or more.

[6] The laminate wherein the above-mentioned modified polyolefin (B) has an MFR (230° C., 2,160 g) measured in accordance with ASTM D1238 of 3.5 g/10 min or more.

[7] The laminate wherein the above-mentioned modified polyolefin (B) has a wave number showing the maximum intensity of 721 $cm^{-1}$ or more among absorptions in a wave number of 710 $cm^{-1}$ or more and 740 $cm^{-1}$ or less in FT-IR measurement.

[8] The laminate wherein the above-mentioned modified polyolefin (B) is produced by a method in which a polyolefin before modification is melted, the above-mentioned unsaturated compound having a functional group is added thereto, and the resultant mixture is subjected to graft copolymerization.

[9] The laminate wherein the above-mentioned modified polyolefin (B) is a maleic anhydride-modified polypropylene.

[10] The laminate which consists of the above-mentioned Layer (a) and Layer (b).

[11] The laminate which is produced by coextrusion molding.

[12] A laminate hollow molded body comprising the laminate.

[13] The laminated hollow molded body wherein the above-mentioned Layer (a) and Layer (b) are arranged in this order from the outside.

[14] The laminated hollow molded body wherein the above-mentioned Layer (b) is arranged at the innermost layer.

[15] The laminated hollow molded body wherein the innermost layer contains a further layer.

[16] The laminated hollow molded body which is a tube.

Advantageous Effects of Invention

According to the present invention, it is possible to provide a laminate which is excellent in low temperature impact resistance and bursting pressure strength at the time of high temperature even when it has the constitution in which the layer of the modified polyolefin is thick.

DESCRIPTION OF EMBODIMENTS

The laminate has two or more layers comprising Layer (a) and Layer (b), the above-mentioned Layer (a) contains an aliphatic polyamide composition (A), the above-mentioned Layer (b) contains a modified polyolefin (B), the above-mentioned modified polyolefin (B) contains a unit derived from a monomer based on an α-olefin having 2 or more and 10 or less carbon atoms, and a unit derived from an unsaturated compound having at least one functional group, the unsaturated compound is selected from the group consisting of unsaturated compounds having at least one group selected from the group consisting of a carboxyl group, a hydroxyl group, an epoxy group, an amino group, an amide group, an imide group, a nitrile group, a thiol group and an isocyanate group; and derivatives of unsaturated compounds having a carboxyl group, and the above-mentioned modified polyolefin (B) has a Shore hardness (D scale) measured in accordance with ASTM D2240 of 30 or more and 61 or less.

The laminate is excellent in low temperature impact resistance and bursting pressure strength at the time of high temperature even when the layer of the modified polyolefin has a thick constitution.

1. Layer (a)

Layer (a) of the laminate contains an aliphatic polyamide composition (A).

<Aliphatic Polyamide Composition (A)>

The aliphatic polyamide composition (A) is not particularly limited as long as it is a composition containing an aliphatic polyamide having an amide bond (—CONH—) in the main chain. As the aliphatic polyamide, there may be mentioned homopolymers, such as polyamide 6 (polycaproamide), polyamide 11 (polydodecaneamide), polyamide 12 (polydodecaneamide), polyamide 26 (polyethylene adipamide), polyamide 44 (polytetramethylene succinamide), polyamide 45 (polytetramethylene glutamide), polyamide 46 (polytetramethylene adipamide), polyamide 48 (polytetramethylene suberamide), polyamide 49 (polytetramethylene azelamide), polyamide 410 (polytetramethylene sebacamide), polyamide 412 (polytetramethylene dodecamide), polyamide 54 (polypentamethylene succinamide), polyamide 55 (polypentamethylene glutamide), polyamide 56 (polypentamethylene adipamide), polyamide 58 (polypentamethylene adipamide), polypentamethylene azelamide (polyamide 59), polypentamethylene sebacamide (polyamide 510), polypentamethylene dodecamide (polyamide 512), polyhexamethylene succinamide (polyamide 64), polyhexamethylene glutamide (polyamide 65), polyhexamethylene adipamide (polyamide 66), polyhexamethylene suberamide (polyamide 68), polyhexamethylene azelamide (polyamide 69), polyhexamethylene sebacamide (polyamide 610), polyhexamethylene dodecamide (polyamide 612), polyhexamethylene tetradecamide (polyamide 614), polyhexamethylene hexadecamide (polyamide 616), polyhexamethylene octadecamide (polyamide 618), polynonamethylene adipamide (polyamide 96), polynonamethylene suberamide (polyamide 98), polynonamethylene azelamide (polyamide 99), polynonamethylene sebacamide (polyamide 910), polynonamethylene dodecamide (polyamide 912), polydecamethylene adipamide (polyamide 106), polydecamethylene suberamide (polyamide 108), polydecamethylene azelamide (polyamide 109), polydecamethylene sebacamide (polyamide 1010), polydecamethylene dodecamide (polyamide 1012), polydodecamethylene adipamide (polyamide 126), polydodecamethylene suberamide (polyamide 128), polydodecamethylene azelamide (polyamide 129), polydodecamethylene sebacamide (polyamide 1210), polydodecamethylene dodecamide (polyamide 1212), etc.; copolymers using several of raw material monomers forming these, etc.

The aliphatic polyamide composition (A) preferably contains a polyamide (A1).

[Polyamide (A1)]

The polyamide (A1) is an aliphatic polyamide having a ratio of a number of methylene groups to a number of amide groups (hereinafter sometimes referred to as $[CH_2]/[NHCO]$.) of 7.0 or more (hereinafter sometimes referred to as polyamide (A1).). By using the aliphatic polyamide having $[CH_2]/[NHCO]$ of 7.0 or more, various physical properties such as mechanical properties of the laminate can be made excellent. The upper limit value of $[CH_2]/[NHCO]$ is not particularly limited, and it is practically 11.0 or less.

As the polyamide (A1), there may be mentioned, homopolymers, such as polyamide 11 ($[CH_2]/[NHCO]=$ 10.0), polyamide 12 ($[CH_2]/[NHCO]=11.0$), polyamide 412 ($[CH_2]/[NHCO]=7.0$), polyamide 512 ($[CH_2]/[NHCO]=$ 7.5), polyamide 610 ($[CH_2]/[NHCO]=7.0$), polyamide 612 ($[CH_2]/[NHCO]=8.0$), polyamide 614 ($[CH_2]/[NHCO]=$ 9.0), polyamide 616 ($[CH_2]/[NHCO]=10.0$), polyamide 618 ($[CH_2]/[NHCO]=11.0$), polyamide 98 ($[CH_2]/[NHCO]=$ 7.5), polyamide 99 ($[CH_2]/[NHCO]=8.0$), polyamide 910 ($[CH_2]/[NHCO]=8.5$), polyamide 912 ($[CH_2]/[NHCO]=$ 9.5), polyamide 106 ($[CH_2]/[NHCO]=7.0$), polyamide 108 ($[CH_2]/[NHCO]=8.0$), polyamide 109 ($[CH_2]/[NHCO]=$ 8.5), polyamide 1010 ($[CH_2]/[NHCO]=9.0$), polyamide 1012 ($[CH_2]/[NHCO]=10.0$), polyamide 126 ($[CH_2]/[NHCO]=8.0$), polyamide 128 ($[CH_2]/[NHCO]=9.0$), polyamide 129 ($[CH_2]/[NHCO]=9.5$), polyamide 1210 ($[CH_2]/[NHCO]=10.0$), polyamide 1212 ($[CH_2]/[NHCO]=11.0$), etc. and/or copolymers using several of raw material monomers forming these, etc.

As the polyamide (A1), from the viewpoint of sufficiently ensuring various physical properties such as mechanical properties, heat resistance, etc. of the laminate, and the viewpoint of economic efficiency, availability, etc., it is preferable to use at least one homopolymer selected from the group consisting of polyamide 11, polyamide 12, polyamide 610, polyamide 612, polyamide 1010, polyamide 1012 and polyamide 1212, and/or at least one copolymer using several of raw material monomers forming these.

[Characteristics of Polyamide (A1)]

A relative viscosity of the polyamide (A1) measured under the conditions of 96% sulfuric acid and the polymer concentration of 1% at 25° C. in accordance with JIS K-6920 is preferably 1.5 or more and 5.0 or less, and more preferably 2.0 or more and 4.5 or less from the viewpoints of ensuring mechanical properties of the laminate and ensuring desirable molding property of the laminate by making the viscosity at the time of melting in the appropriate range.

When the terminal amino group concentration per 1 g of the polyamide (A1) is made [A] (μeq/g) and the terminal carboxyl group concentration is made [B] (μeq/g), from the viewpoint of sufficiently ensuring interlayer adhesiveness of the laminate, it is preferable to be [A]>[B]+5, more preferable to be [A]>[B]+10, and particularly preferable to be [A]>[B]+15. Further, from the viewpoints of melt stability and suppression of generating gel-like substance of the polyamide, it is preferable to be [A]>20, and particularly preferable to be 30<[A]<120.

Here, the terminal amino group concentration [A] (μeq/g) can be measured by dissolving the polyamide in a phenol/methanol mixed solution and titrating it with 0.05N hydrochloric acid. The terminal carboxyl group concentration [B] (μeq/g) can be measured by dissolving the polyamide in benzyl alcohol, and titrating it with a 0.05N sodium hydroxide solution.

The polyamide (A1) is also preferable to be an aliphatic polyamide mixture comprising two or more aliphatic polyamides having different terminal amino group concentrations and/or terminal carboxyl group concentrations as long as it satisfies the above-mentioned terminal group concentrations. In this case, the terminal amino group concentration and/or the terminal carboxyl group concentration of the aliphatic polyamide mixture is determined by the terminal amino group concentrations and the terminal carboxyl group concentrations of the aliphatic polyamides constituting the mixture, and their formulation ratio.

[Production Method of Polyamide (A1)]

The polyamide (A1) is produced by polymerizing or copolymerizing the polyamide raw material(s) in the presence of an amine by a conventionally known method such as melt polymerization, solution polymerization, solid phase polymerization or a combination thereof. Alternatively, the polyamide (A1) is produced by, after polymerizing the polyamide raw material(s), melt-kneading the resulting polymer in the presence of an amine. Here, polymerization of the polyamide raw material(s) can be carried out by repeating the operations at normal pressure, reduced pressure and application of pressure.

As the raw materials of the polyamide (A1), there may be mentioned an aliphatic lactam, an aliphatic aminocarboxylic acid, or a combination of an aliphatic diamine and an aliphatic dicarboxylic acid.

As the aliphatic lactams, there may be mentioned caprolactam, enantolactam, undecanelactam, dodecanelactam, α-pyrrolidone, α-piperidone, etc. These can be used one kind or two or more kinds.

As the aliphatic aminocarboxylic acids, there may be mentioned κ-aminocaproic acid, 7-aminoheptanoic acid, 9-aminononanoic acid, 11-aminoundecanoic acid, 12-aminododecanoic acid, etc. These can be used one kind or two or more kinds.

As the aliphatic diamines, there may be mentioned 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, 1,20-eicosanediamine, 2-methyl-1,5-pentanediamine, 3-methyl-1,5-pentanediamine, 2-methyl-1,8-octanediamine, 2,2,4-trimethyl-1,6-hexanediamine, 2,4,4-trimethyl-1,6-hexanediamine, 5-methyl-1,9-nonanediamine, etc. These can be used one kind or two or more kinds.

As the aliphatic dicarboxylic acids, there may be mentioned glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid, eicosanedioic acid, etc. These can be used one kind or two or more kinds.

As the amines, there may be mentioned monoamines, diamines, triamines and polyamines. These can be used one kind or two or more kinds. Provided that, when the raw materials of the polyamide (A1) are a combination of the aliphatic diamine and the aliphatic dicarboxylic acid, the amines do not include aliphatic diamines.

As the monoamines, there may be mentioned aliphatic monoamines such as methylamine, ethylamine, propylamine, butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, octadecylamine, octadecyleneamine, eicosylamine, docosylamine, etc.; alicyclic monoamines such as cyclohexylamine, methylcyclohexylamine, etc.; aromatic monoamines such as benzylamine, β-phenylmethylamine, etc.; symmetric secondary amines such as N,N-dimethylamine, N,N-diethylamine, N,N-dipropylamine, N,N-dibutylamine, N,N-dihexylamine, N,N-dioctylamine, etc.; and hybrid secondary amines such as N-methyl-N-ethylamine, N-methyl-N-butylamine, N-methyl-N-dodecylamine, N-methyl-N-octadecylamine, N-ethyl-N-hexadecylamine, N-ethyl-N-octadecylamine, N-propyl-N-hexadecylamine, N-propyl-N-benzylamine, etc. These can be used one kind or two or more kinds.

As the diamines, there may be mentioned aliphatic diamines such as 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 2-methyl-1,5-pentanediamine, 3-methyl-1,5-pentanediamine, 2-methyl-1,8-octanediamine, 2,2,4-trimethyl-1,6-hexanediamine, 2,4,4-trimethyl-1,6-hexanediamine, 5-methyl-1,9-nonanediamine, etc.; alicyclic diamines such as 1,3-bis(aminomethyl)cyclohexane, 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl)propane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, 2,5-bis(aminomethyl)norbornane, 2,6-bis(aminomethyl)norbornane, 3,8-bis(aminomethyl)-tricyclodecane, 4,9-bis(aminomethyl)tricyclodecane, etc.; and aromatic diamines such as m-xylylenediamine, p-xylylenediamine, etc. These can be used one kind or two or more kinds.

The amine can be added at any stage during polymerization of the polyamide raw material(s), or, after polymerization of the polyamide raw material(s), at any stage during melt-kneading, and when interlayer adhesiveness of the laminate is taken into consideration, it is preferable to add at the stage of the polymerization. Also, the amine(s) is/are preferably added by adding a diamine and/or a polyamine at the time of the polymerization of the polyamide raw material (s) in order to satisfy the condition of the above-mentioned terminal amino group concentration, and particularly preferably added by adding at least one kind selected from the group consisting of an aliphatic diamine, an alicyclic diamine and a polyalkyleneimine at the time of the polymerization of the polyamide raw material(s) from the viewpoint of suppressing generation of gel.

Further, if necessary, a carboxylic acid such as a monocarboxylic acid, a dicarboxylic acid, a tricarboxylic acid, etc. may be added within the range which satisfies the above-mentioned terminal group concentration. In this case, the amine and the carboxylic acid may be added simultaneously, or may be added separately.

As the carboxylic acids, there may be mentioned aliphatic monocarboxylic acids such as acetic acid, propionic acid, butyric acid, valeric acid, caproic acid, enanthic acid, caprylic acid, capric acid, pelargonic acid, undecanoic acid, lauric acid, tridecanoic acid, myristic acid, myristoleic acid, palmitic acid, stearic acid, oleic acid, linolic acid, arachic acid, behenic acid, erucic acid, etc.; alicyclic monocarboxylic acids such as cyclohexane carboxylic acid, methylcyclohexane carboxylic acid, etc.; aromatic monocarboxylic acids such as benzoic acid, toluic acid, ethylbenzoic acid, phenylacetic acid, etc.; aliphatic dicarboxylic acids such as malonic acid, succinic acid, glutaric acid, adipic acid, pimelic acid, suberic acid, azelaic acid, sebacic acid, undecanedioic acid, dodecanedioic acid, hexadecanedioic acid, hexadecenedioic acid, octadecanedioic acid, octadecenedioic acid, eicosanedioic acid, eicosenedioic acid, docosanedioic acid, diglycolic acid, 2,2,4-trimethyladipic acid, 2,4,4-trimethyladipic acid, etc.; alicyclic dicarboxylic acids such as 1,3-cyclohexanedicarboxylic acid, 1,4-cyclohexane dicarboxylic acid, norbornane dicarboxylic acid, etc.; aromatic dicarboxylic acids such as terephthalic acid, isophthalic acid, phthalic acid, m-xylylene dicarboxylic acid, p-xylylene dicarboxylic acid, 1,4-naphthalene dicarboxylic acid, 2,6-naphthalene dicarboxylic acid, 2,7-naphthalene dicarboxylic acid, etc.; and tricarboxylic acids such as 1,2,4-butanetricarboxylic acid, 1,3,5-pentanetricarboxylic acid, 1,2,6-hexanetricarboxylic acid, 1,3,6-hexanetricarboxylic acid, 1,3,5-cyclohexanetricarboxylic acid, trimesic acid, etc. These can be used one kind or two or more kinds.

A used amount of the amine can be appropriately determined according to the conventionally known method in consideration with the terminal amino group concentration, the terminal carboxyl group concentration and the relative viscosity of the polyamide (A1). In general, based on 1 mol of the polyamide raw material(s) (1 mol of a monomer or a monomer unit constituting the recurring unit), an amount of the amine to be added is preferably 0.5 meq/mol or more and 20 meq/mol or less, and more preferably 1.0 meq/mol or more and 10 meq/mol or less from the viewpoints of obtaining sufficient reactivity and making production of the polyamide having a desired viscosity easy. Here, 1 equivalent (eq) of the amino group is defined as the amount of an amino group that reacts with a carboxyl group with 1:1 to form an amide group.

As producing apparatuses of the polyamide (A1), there may be mentioned conventionally known polyamide producing apparatuses including a batch type reaction tank, a single-tank or multi-tank continuous reaction device, a tubular continuous reaction device, a kneading reaction extruder such as a uniaxial kneading extruder, a twin-screw kneading extruder, etc.

[Further Components]

The aliphatic polyamide composition (A) may contain a further component(s), if necessary. As such a further component(s), there may be mentioned a polyamide other than the polyamide (A1), for example, an aliphatic polyamide having $[CH_2]/[NHCO]$ of less than 7.0, a polyamide resin having an alicyclic or aromatic group at the main chain or the side chain, etc.; an impact resistant agent, a plasticizer, a heat resistant agent selected from an antioxidant and a heat stabilizer, an ultraviolet absorber, a light stabilizer, a lubricant, an inorganic filler, an antistatic agent, a flame retardant, a crystallization accelerator, a colorant, etc. As the further component(s), it is preferable to contain one or more kinds selected from the group consisting of a plasticizer, an impact resistant agent and a heat resistant agent. These can be used one kind or two or more kinds.

[Impact Resistant Agent]

The aliphatic polyamide composition (A) preferably contains an impact resistant agent from the viewpoint of imparting impact resistance to the laminate. Incidentally, the impact resistant agent is not the modified polyolefin (B). That is, the impact resistant agent has a Shore hardness (D scale) measured in accordance with ASTM D2240 of less than 30, and preferably less than 20. In the impact resistant agent, the lower limit of the Shore hardness (D scale) measured in accordance with ASTM D2240 is not particularly limited, and can be made 0.5 or more. As the impact resistant agents, there may be mentioned an elastomer polymer which has a constitutional unit derived from an unsaturated compound having a carboxyl group and/or an acid anhydride group, and has a Shore hardness (D scale) measured in accordance with ASTM D2240 of less than 30.

As the elastomer polymers, there may be mentioned an (ethylene and/or propylene)/α-olefin-based copolymer, an (ethylene and/or propylene)/(α,β-unsaturated carboxylic acid ester)-based copolymer, etc., and these can be used one kind or two or more kinds.

The above-mentioned (ethylene and/or propylene)/α-olefin-based copolymer is a polymer in which ethylene and/or propylene and an α-olefin having 3 or more carbon atoms are copolymerized, and as the α-olefin having 3 or more carbon atoms, there may be mentioned propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, etc. These can be used one kind or two or more kinds. In addition, it may be copolymerized with a polyene including a conjugated diene such as 1,3-butadiene; and a nonconjugate diene such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, cyclooctadiene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, 2-propenyl-2,5-norbornadiene, etc. These can be used one kind or two or more kinds.

The above-mentioned (ethylene and/or propylene)/(α,β-unsaturated carboxylic acid ester)-based copolymer is a polymer in which ethylene and/or propylene and an α,β-unsaturated carboxylic acid ester are copolymerized, and as the α,β-unsaturated carboxylic acid ester monomers, there may be mentioned methyl acrylate, methyl methacrylate, ethyl acrylate, ethyl methacrylate, propyl acrylate, propyl methacrylate, butyl acrylate, butyl methacrylate, pentyl acrylate, pentyl methacrylate, hexyl acrylate, hexyl methacrylate, heptyl acrylate, heptyl methacrylate, octyl acrylate, octyl methacrylate, nonyl acrylate, nonyl methacrylate, decyl acrylate, decyl methacrylate, 2-ethylhexyl acrylate, 2-ethylhexyl methacrylate, hydroxyethyl acrylate, hydroxyethyl methacrylate, monomethyl maleate, monomethyl itaconate, dimethyl maleate, dimethyl itaconate, etc. These can be used one kind or two or more kinds.

As the unsaturated compounds having a carboxyl group in the elastomer polymer, there may be mentioned α,β-unsaturated carboxylic acids such as acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid, endobicyclo-[2.2.1]-5-heptene-2,3-dicarboxylic acid, and a metal salt of these carboxylic acids, etc. As the unsaturated compounds having an acid anhydride group, there may be mentioned dicarboxylic acid anhydrides having an α,β-unsaturated bond such as maleic anhydride, itaconic anhydride, citraconic anhydride, endobicyclo-[2.2.1]-5-heptene-2,3-dicarboxylic acid anhydride, etc. These can be used one kind or two or more kinds. Among these, the dicarboxylic acid anhydrides having an α,β-unsaturated bond are preferable, and maleic anhydride and itaconic anhydride are more preferable.

The concentration(s) of the carboxyl group and/or the acid anhydride group in the elastomer polymer is/are preferably 25 µeq/g or more and 200 µeq/g or less, and more preferably 50 µeq/g or more and 150 µeq/g or less from the viewpoints of exhibiting good compatibility with the above-mentioned polyamide (A1) and fluidity of the aliphatic polyamide composition (A).

Incidentally, the concentration(s) of the carboxyl group and/or the acid anhydride group in the elastomer polymer can be measured by dissolving the elastomer polymer in a toluene solution, using a sample solution prepared by further adding ethanol, and titrating with 0.1N KOH ethanol solution using phenolphthalein as an indicator.

[Plasticizer]

The aliphatic polyamide composition (A) preferably contains a plasticizer from the viewpoint of imparting flexibility to the laminate. As the plasticizers, there may be mentioned N-butylbenzenesulfonamide, p-hydroxybenzoic acid 2-hexyldecyl ester, etc. These can be used one kind or two or more kinds.

[Heat Resistant Agent]

The aliphatic polyamide composition (A) preferably contains a heat resistant agent selected from an antioxidant and a heat stabilizer. As the antioxidants, there may be mentioned a phenol-based compound, etc. The heat stabilizer is also called a processing stabilizer, and there may be mentioned, for example, a thioether-based, a phosphorus-based and a halogenated metal-based compound, and it is preferably a phosphorus-based compound. The antioxidant and the heat stabilizer can be used one kind or two or more kinds.

[Characteristics of Aliphatic Polyamide Composition (A)]

The aliphatic polyamide composition (A) preferably has bending elastic modulus measured in accordance with ISO 178 of 400 MPa or more and 1,000 MPa or less, more preferably 450 MPa or more and 950 MPa or less, and particularly preferably 500 MPa or more and 900 MPa or less. By making the bending elastic modulus of the aliphatic polyamide composition (A) within the above-mentioned range, flexibility of the laminate can be made excellent while maintaining bursting pressure strength at the time of high temperature of the laminate. The bending elastic modulus of the aliphatic polyamide composition (A) can be adjusted by appropriately changing an added amount of the impact resistant agent or the plasticizer.

[Composition of Aliphatic Polyamide Composition (A)]

A content of the polyamide (A1) in the aliphatic polyamide composition (A) is preferably 55% by mass or more and 95% by mass or less based on 100% by mass of the aliphatic polyamide composition (A), more preferably 60% by mass or more and 95% by mass or less, and particularly preferably 70% by mass or more and 89% by mass or less. By making the content of the polyamide (A1) in the aliphatic polyamide composition (A) within the above-mentioned range, characteristics such as bursting pressure strength at the time of high temperature of the laminate can be made sufficiently excellent. Also, when the content of the polyamide (A1) is the above-mentioned lower limit value or more, bursting pressure strength at the time of high temperature of the laminate can be obtained sufficiently. When the content of the polyamide (A1) is the above-mentioned upper limit value or less, flexibility and low temperature impact resistance of the laminate can be obtained sufficiently.

A content of the impact resistant agent in the aliphatic polyamide composition (A) is preferably 5% by mass or more and 30% by mass or less based on 100% by mass of the aliphatic polyamide composition (A), more preferably 7% by mass or more and 25% by mass or less, and particularly preferably 10% by mass or more and 20% by mass or less. By making the content of the impact resistant agent in the aliphatic polyamide composition (A) within the above-mentioned range, flexibility and low temperature impact resistance of the laminate can be made more excellent while maintaining mechanical properties of the laminate. Also, when the content of the impact resistant agent is the above-mentioned lower limit value or more, flexibility and low temperature impact resistance of the laminate can be obtained sufficiently. When the content of the impact resistant agent is the above-mentioned upper limit value or less, bursting pressure strength at the time of high temperature and the other mechanical properties of the laminate can be obtained sufficiently.

A content of the plasticizer in the aliphatic polyamide composition (A) is preferably 0% by mass or more and 15% by mass or less based on 100% by mass of the aliphatic polyamide composition (A), and particularly preferably 1% by mass or more and 10% by mass or less. By making the content of the plasticizer within the above-mentioned range, flexibility of the laminate can be made excellent while maintaining bursting pressure strength at the time of high temperature of the laminate. Also, when the content of the plasticizer is the above-mentioned upper limit value or less, bursting pressure strength at the time of high temperature of the laminate can be obtained sufficiently.

A content of the heat resistant agent in the aliphatic polyamide composition (A) is preferably 0% by mass or more and 5% by mass or less based on 100% by mass of the aliphatic polyamide composition (A), and particularly preferably 0.5% by mass or more and 2% by mass or less. By making the content of the heat resistant agent within the above-mentioned range, mechanical properties, heat resistance, etc. of the laminate can be balanced.

The content(s) of the further component(s) other than the impact resistant agent, the plasticizer and the heat resistant agent in the aliphatic polyamide composition (A) can be appropriately set depending on the characteristics to be required.

[Producing Method of Aliphatic Polyamide Composition (A)]

A method for producing the aliphatic polyamide composition (A) is not particularly limited, and various kinds of conventionally known methods can be adopted. For example, it can be produced by a method in which pellets of the polyamide (A1), the impact resistant agent, the plasticizer and the heat resistant agent are uniformly dry-blended with, if necessary, other components to be added, so as to have the above-mentioned mixing ratio using a tumbler or a mixer, a method in which the polyamide (A1), the impact resistant agent, the plasticizer and the heat resistant agent are previously dry-blended with, if necessary, other components to be added, and the resultant mixture is melted and kneaded, a method in which the polyamide (A1), the impact resistant agent, the plasticizer and the heat resistant agent are previously dry-blended with, if necessary, other components to be added, these are each separately fed, and the resultant mixture is melted and kneaded, and the like. Melting and kneading can be carried out using a kneading machine such as a single-screw extruder, a twin-screw extruder, a kneader, a Banbury mixer, etc.

2. Layer (b)

Layer (b) of the laminate contains a modified polyolefin (B).

<Modified Polyolefin (B)>

The modified polyolefin (B) is a polymer containing a unit derived from a monomer based on an α-olefin having 2 or more and 10 or less carbon atoms, and a unit derived from an unsaturated compound having at least one functional group, wherein the unsaturated compound is selected from the group consisting of unsaturated compounds having at least one group selected from the group consisting of a carboxyl group, a hydroxyl group, an epoxy group, an amino group, an amide group, an imide group, a nitrile group, a thiol group and an isocyanate group; and derivatives of unsaturated compounds having a carboxyl group; and the polymer having a Shore hardness (D scale) measured in accordance with ASTM D2240 of 30 or more and 61 or less (hereinafter sometimes referred to as modified polyolefin (B).).

[Monomer Based on α-Olefin Having 2 or More and 10 or Less Carbon Atoms]

A polyolefin (B1) constituting the modified polyolefin (B) contains a unit derived from a monomer based on an α-olefin having 2 or more and 10 or less carbon atoms.

As the monomers based on an α-olefin having 2 or more and 10 or less carbon atoms, there may be mentioned ethylene, propylene, 1-butene, 1-pentene, 1-hexene, 1-heptene, 1-octene, 1-nonene, 1-decene, 3-methyl-1-butene, 3-methyl-1-pentene, 3-ethyl-1-pentene, 4-methyl-1-pentene, 4,4-dimethyl-1-pentene, 4-methyl-1-hexene, 4,4-dimethyl-1-hexene, 4,4-dimethyl-1-pentene, 4-ethyl-1-hexene, 3-ethyl-1-hexene, etc. These can be used one kind or two or more kinds. Among these, from the viewpoint of making mechanical properties and flexibility of the laminate particularly excellent, a monomer based on an α-olefin having 2 or more and 8 or less carbon atoms is preferable.

[Other Monomers]

The polyolefin (B1) may contain other monomers than the monomer based on an α-olefin having 2 or more and 10 or less and an unsaturated compound having a functional group, for example, styrenes, conjugated dienes such as 1,3-butadiene, nonconjugated dienes, cyclic olefins, oxygen atom-containing olefins, etc., within the range that does not impair excellent various properties of the laminate. As the styrenes, there may be mentioned styrene, o-methylstyrene, m-methylstyrene, p-methylstyrene, 1,5-dimethylstyrene, 2,4-dimethylstyrene, vinylnaphthalene, vinylanthracene, 4-propylstyrene, 4-cyclohexylstyrene, 4-dodecylstyrene, 2-ethyl-4-benzylstyrene, 4-(phenylbutyl)styrene, etc. As the nonconjugated dienes, there may be mentioned 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), etc. As the cyclic olefins, there may be mentioned dicyclopentadiene, cyclohexadiene, cyclooctadiene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, 2-propenyl-2,5-norbornadiene, etc. As the oxygen atom-containing olefins, there may be mentioned hexenol, hexenoic acid, methyl octenoate, etc.

As the polyolefin (B1), a crystalline polyolefin such as polyethylene, polypropylene, polybutene-1, poly(4-methylpentene-1), an α-olefin copolymer of ethylene, propylene, 1-butene or 4-methylpentene-1 with other monomer, etc. is preferable. These can be used one kind or two or more kinds.

[Composition of polyolefin (B1)]

In the polyolefin (B1), a content of the unit derived from a monomer based on an α-polyolefin having 2 or more and 10 or less carbon atoms is preferably 60 mol % or more based on 100 mol % of the whole polymerization units of the polyolefin (B1), more preferably 70 mol % or more, and particularly preferably 90 mol % or more. By making the content of the unit derived from a monomer based on an α-polyolefin having 2 or more and 10 or less carbon atoms the above-mentioned value or more, mechanical properties and flexibility of the laminate become further excellent. In addition, in the polyolefin (B1), a content of the unit derived from the other monomer(s) is preferably less than 40 mol % based on 100 mol % of the whole polymerization units of the polyolefin (B1), more preferably less than 30 mol %, and particularly preferably less than 10 mol %.

Accordingly, as the polyolefin (B1), a polypropylene homopolymer, a random copolymer of propylene and 20 mol % or less of the other α-olefin(s), and a block copolymer of propylene and 30 mol % or less of the other α-olefin(s) is more preferable.

[Producing Method of Polyolefin (B1)]

Production of the polyolefin (B1) can be carried out by any conventionally known method, and the polyolefin (B1) can be polymerized using, for example, a titanium-based catalyst, a vanadium-based catalyst, a metallocene catalyst, etc. Also, the polyolefin (B1) may be any form of a resin and an elastomer, both an isotactic structure and a syndiotactic structure can be used, and there is no particular limitation on the stereoregularity. When the polyolefin (B1) is a copolymer, it may be any of alternating copolymerization, random copolymerization and block copolymerization.

[Unsaturated Compound Having a Functional Group]

The modified polyolefin (B) contains a unit derived from an unsaturated compound having at least one functional group, wherein the unsaturated compound is selected from the group consisting of unsaturated compounds having at least one group selected from the group consisting of a carboxyl group, a hydroxyl group, an epoxy group, an amino group, an amide group, an imide group, a nitrile group, a thiol group and an isocyanate group; and derivatives of unsaturated compounds having a carboxyl group. By the modified polyolefin (B) containing a unit derived from the unsaturated compound having a functional group (i.e., unsaturated compounds having at least one group selected from the group consisting of specific groups and/or derivatives of unsaturated compounds having a carboxyl group), interlayer adhesiveness of Layer (a) and Layer (b) can be made high, and durability of the laminate can be made high.

As the unsaturated compounds having a carboxyl group, there may be mentioned, for example, unsaturated carboxylic acids such as acrylic acid, methacrylic acid, maleic acid, fumaric acid, tetrahydrophthalic acid, itaconic acid, citraconic acid, crotonic acid, isocrotonic acid, norbornene dicarboxylic acid, bicyclo[2,2,1]hepto-2-en-5,6-dicarboxylic acid, endobicyclo-[2.2.1]-5-heptene-2,3-dicarboxylic acid, etc. These can be used one kind or two or more kinds.

As the derivatives of unsaturated compounds having a carboxyl group, there may be mentioned, for example, an acid anhydride, an acid halide, an amide, an imide and/or an ester of the above-mentioned unsaturated compound having a carboxyl group. As the derivatives of unsaturated compounds having a carboxyl group, there may be mentioned, for example, malenyl chloride, malenyl imide, maleic anhydride, itaconic anhydride, citraconic anhydride, tetrahydrophthalic anhydride, bicyclo[2,2,1]hept-2-en-5,6-dicarboxylic anhydride, endobicyclo-[2.2.1]-5-heptene-2,3- dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo[2,2,1]hept-2-en-5,6-dicarboxylate, etc. These can be used one kind or two or more kinds.

As the unsaturated compounds having a hydroxyl group, there may be mentioned, for example, a hydroxyl group-containing (meth)acrylic acid ester such as hydroxyethyl acrylate, hydroxyethyl methacrylate, hydroxypropyl acrylate, hydroxypropyl methacrylate, glycerin mono(meth)acrylate, pentaerythritol mono(meth)acrylate, etc.; 10-undecene-1-ol, 1-octene-3-ol, glycerin monoallyl ether, allyl alcohol, 2-butene-1,4-diol, etc. These can be used one kind or two or more kinds.

As the unsaturated compounds having an epoxy group, there may be mentioned, for example, a glycidyl ester of an unsaturated carboxylic acid such as glycidyl acrylate, glycidyl methacrylate, etc., or a monoglycidyl ester of an unsaturated dicarboxylic acid such as maleic acid, fumaric acid, etc. (the number of the carbon atoms of the alkyl group in the case of a monoglycidyl ester is 1 or more and 12 or less), an alkyl glycidyl ester of p-styrene carboxylic acid, 2-methylallyl glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinyl cyclohexene monoxide, etc. These can be used one kind or two or more kinds.

As the unsaturated compounds having an amino group, there may be mentioned, for example, aminoalkyl ester-based derivatives of acrylic acid or methacrylic acid such as aminomethyl acrylate, aminomethyl methacrylate, dimethylaminoethyl methacrylate, aminopropyl acrylate, aminopropyl methacrylate, cyclohexylaminoethyl methacrylate, etc., and vinylamine-based derivatives such as N-vinyldiethylamine, N-acetylvinylamine, etc. These can be used one kind or two or more kinds.

As the unsaturated compounds having an amide group, there may be mentioned, for example, acrylamide-based derivatives such as acrylamide, methacrylamide, N-methylacrylamide, N,N-dimethylacrylamide, N,N-dimethylaminopropylacrylamide, etc. These can be used one kind or two or more kinds.

As the unsaturated compounds having an imide group, there may be mentioned, for example, N-acryloyloxyethyl-1,2,3,6-tetrahydrophthalimide (available from TOAGOSEI CO., LTD., product name: Aronix TO-1428), N-acryloyloxyethyl-hexahydrophthalimide (available from TOAGOSEI CO., LTD., product name: Aronix TO-1429), N-acryloyloxyethyl-3,4,5,6-tetrahydrophthalimide (available from TOAGOSEI CO., LTD., product name: Aronix TO-1534), etc. These can be used one kind or two or more kinds.

As the unsaturated compounds having a nitrile group, there may be mentioned, for example, acrylonitrile, methacrylonitrile, 5-hexenenitrile, 5-methyl-5-hexenenitrile, methyl-2-cyano acrylate, ethyl-2-cyano acrylate, butyl-2-cyano acrylate, cyclohexyl-2-cyano acrylate, 2-ethylhexyl-2-cyano acrylate, ethoxyethyl-2-cyano acrylate, etc. These can be used one kind or two or more kinds.

As the unsaturated compounds having a thiol group, there may be mentioned, for example, esters of a thiol group-containing compound such as aliphatic or aromatic mercapto alcohols or dithiol, including 2-mercaptoethanol, ethane dithiol, 1,2-propane dithiol, 1,3-propane dithiol, para-hydroxythiophenol, 3-mercapto-1,2-propane dithiol, 1,4-butane dithiol, 2-mercaptoethyl ether, 2-mercaptoethylsulfide, etc.; with acrylic acid or methacrylic acid. These can be used one kind or two or more kinds.

As the unsaturated compounds having an isocyanate group, there may be mentioned, for example, 2-methacryloyloxyethyl isocyanate (available from SHOWA DENKO K.K., product name: Karenz MOI (Registered Trademark)), 2-acryloyloxyethyl isocyanate (available from SHOWA DENKO K.K., product name: Karenz AOI (Registered Trademark)), etc. These can be used one kind or two or more kinds.

The unsaturated compound having a functional group is preferably maleic anhydride, itaconic anhydride, citraconic anhydride, tetrahydrophthalic anhydride, endobicyclo-[2.2.1]-5-heptene-2,3-dicarboxylic acid anhydride, acrylic acid, methacrylic acid, hydroxyethyl acrylate, hydroxyethyl methacrylate, glycidyl methacrylate or aminopropyl methacrylate, more preferably a dicarboxylic acid anhydride such as maleic anhydride, itaconic anhydride, citraconic anhydride, tetrahydrophthalic anhydride and endobicyclo-[2.2.1]-5-heptene-2,3-dicarboxylic acid anhydride, and particularly preferably maleic anhydride.

The modified polyolefin (B) is preferably maleic anhydride-modified polypropylene from the viewpoints of obtaining a laminate having good mechanical properties, long-term resistance to chemical solutions, and good interlayer adhesiveness.

[Characteristics of Modified Polyolefin (B)]

In the modified polyolefin (B), from the viewpoint of obtaining a laminate having mechanical properties and flexibility at low temperature, the upper limit of the Shore hardness (D scale) measured in accordance with ASTM D2240 is 61 or less, and preferably 59 or less.

Also, from the viewpoint of mechanical strength of the laminate, the lower limit of the Shore hardness (D scale) measured in accordance with ASTM D2240 is 30 or more, preferably 45 or more, and particularly preferably 50 or more.

In the modified polyolefin (B), from the viewpoint of obtaining a laminate having mechanical properties and flexibility at low temperature, a tensile yield point stress measured in accordance with ASTM D638 is preferably 23 MPa or less, and particularly preferably 21 MPa or less. Also, from the same viewpoint, a tensile break point stress measured in accordance with ASTM D638 is preferably 25 MPa or more, and particularly preferably 27 MPa or more.

The modified polyolefin (B) preferably has an MFR value measured under the conditions of 230° C./2,160 g in accordance with ASTM D1238 of 3.5 g/10 min or more and 10.0 g/10 min or less, and more preferably 4.0 g/10 min or more and 7.0 g/10 min or less. By making the MFR value of the modified polyolefin (B) within the above-mentioned range, the laminate is more excellent in impact resistance at low temperature and molding stability of the laminate can be made higher.

In general, the maximum absorption from a wave number of 710 $cm^{-1}$ to 740 $cm^{-1}$ in the FT-IR measurement of a polyolefin changes depending on whether the polyolefin is a homopolymer or a random copolymer, and when it is closer to 710 $cm^{-1}$, the structure is closer to a homopolymer, and when it is closer to 740 $cm^{-1}$, the structure is closer to a random copolymer. In the FT-IR measurement of the modified polyolefin (B), it is preferable that a wave number showing the maximum intensity among absorptions in a wave number of 710 $cm^{-1}$ or more and 740 $cm^{-1}$ or less is 721 $cm^{-1}$ or more. When it is in such a range, a laminated tube excellent in flexibility and more excellent in impact resistance at a low temperature can be obtained.

[Composition of Modified Polyolefin (B)]

In the modified polyolefin (B), a content of the above-mentioned unsaturated compound having a functional group based on 100% by mass of the modified polyolefin (B) is preferably such an amount that is a grafted amount of the unsaturated compound having a functional group mentioned later. Also, when the modified polyolefin (B) is a maleic anhydride-modified polypropylene, a content of the polypropylene in the maleic anhydride-modified polypropylene is preferably 50% by mass or more and 99.5% by mass or less based on 100% by mass of the maleic anhydride-modified polypropylene, more preferably 60% by mass or more and 97% by mass or less, and particularly preferably 70% by mass or more and 95% by mass or less. By the content of the polypropylene in the maleic anhydride-modified polypropylene being the above-mentioned value or more, while flexibility of the laminate can be made sufficient, elution resistance of the low molecular weight materials and ions can be made further excellent. Here, the content of the polypropylene in the maleic anhydride-modified polypropylene can be measured in the same manner as in the grafted amount of the unsaturated compound having a functional group mentioned later.

[Producing Method of Modified Polyolefin (B)]

As the producing method of the modified polyolefin (B), conventionally well-known methods for introducing a unit derived from the above-mentioned unsaturated compound having a functional group into the polyolefin (B1) can be adopted. For example, there may be mentioned a method in which the above-mentioned unsaturated compound having a functional group is subjected to graft copolymerization with the polyolefin (B1), and a method in which an olefin monomer and the above-mentioned unsaturated compound having a functional group are subjected to radical copolymerization, and the method in which the above-mentioned unsaturated compound having a functional group is subjected to graft copolymerization with the polyolefin (B1) is preferable.

Also, as the method in which the above-mentioned unsaturated compound having a functional group is subjected to graft copolymerization with the polyolefin (B1), conventionally known various methods can be adopted. For example, there may be mentioned a method in which a polyolefin before modification is melted, and the above-mentioned unsaturated compound having a functional group is added thereto to carry out graft copolymerization, or a method in which a polyolefin before modification is dissolved in a solvent and a graft monomer(s) is/are added thereto to carry out graft copolymerization, and the like. In any of the cases, in order to subject the above-mentioned unsaturated compound having a functional group to graft polymerization with good efficiency, it is preferable to carry out the reaction in the presence of a radical polymerization initiator.

The radical polymerization initiator is not particularly limited as long as it can promote the reaction of the polyolefin main chain with the above-mentioned unsaturated compound having a functional group, and an organic peroxide or an organic perester is preferable. Specifically, there may be mentioned benzoyl peroxide, dichlorobenzoyl peroxide, dicumylperoxide, di-t-butylperoxide, 2,5-dimethyl-2,5-di(peroxybenzoate)hexyne-3,1,4-bis(t-butylperoxyisopropyl)benzene, lauroyl peroxide, t-butyl peracetate, 2,5-dimethyl-2,5-di(t-butylperoxy)hexyne-3,2,5-dimethyl-2,5-di(t-butylperoxy)hexane, t-butylbenzoate, t-butyl perphenylacetate, t-butyl perisobutyrate, t-butyl per-sec-octoate, t-butyl perpivalate, cumyl perpivalate, t-butyl perdi-ethylacetate, etc., and as the others, there may be mentioned an azo compound, for example, azobis-isobutyronitrile, dimethylazoisobutyronitrile, etc. These can be used one kind or two or more kinds. Among these, dialkyl peroxides such as dicumylperoxide, di-t-butylperoxide, 2,5-dimethyl-2,5-di(t-butylperoxy) hexyne-3,2,5-dimethyl-2,5-di(t-butylperoxy) hexane, 1,4-bis(t-butylperoxyisopropyl) benzene, etc., are more preferred.

The radical polymerization initiator is preferably used in an amount of 0.001 to 10 parts by mass or so based on 100 parts by mass of the polyolefin (B1).

A grafted amount of the above-mentioned unsaturated compound having a functional group is preferably 0.05% by mass or more and 20% by mass or less based on 100% by mass of the polyolefin (B1), more preferably 0.05% by mass or more and 10% by mass or less, further preferably 0.05% by mass or more and 5% by mass or less, and particularly preferably 0.05% by mass or more and 3% by mass or less. Incidentally, the grafted amount of the polyolefin (B1) is a net grafted amount measured after removing the above-mentioned unsaturated compound having a functional group from the polyolefin (B1). Also, the grafted amount can be measured by a known means such as $^{13}$C-NMR, $^{1}$H-NMR measurement, etc. Further, when a monomer having an acidic functional group such as an unsaturated carboxylic acid and its acid anhydride is used as the above-mentioned unsaturated compound having a functional group, it is also possible to use, for example, an acid value as a rough indication amount of the functional group introduced into the polyolefin (B1). Moreover, when maleic anhydride is used as the above-mentioned unsaturated compound having a functional group, the grafted amount can be also obtained using an infrared spectrophotometer based on the absorption spectrum of the carbonyl group of maleic anhydride generally detected in the vicinity of 1780 to 1790 cm$^{-1}$.

The modified polyolefin (B) can be used in combination with, if necessary, various kinds of additives. In this case, Layer (b) contains various kinds of additives in addition to the modified polyolefin. As the above-mentioned additives, there may be mentioned a conductive filler, an antioxidant, a heat stabilizer, an ultraviolet absorber, a light stabilizer, a lubricant, an inorganic filler, an antistatic agent, a flame retardant, a crystallization accelerator, a plasticizer, a colorant, a lubricant agent, other thermoplastic resin, etc. These can be used one kind or two or more kinds.

3. Layer Structure

The laminate contains two or more layers of Layer (a) and Layer (b).

By Layer (a) being contained in the laminate, it is possible to obtain a laminate excellent in mechanical properties, chemical resistance and flexibility. In addition, by Layer (b) being contained in the laminate, chemical solution barrier properties of the laminate, in particular, barrier properties to water vapor, a coolant (LLC) and a urea solution as well as long-term chemical solution resistance become good.

The laminate is preferably constituted by arranging Layer (a) and Layer (b) in this order from the outside to the inside. According to this constitution, both the characteristics such as mechanical properties by Layer (a) and the characteristics such as chemical solution barrier properties by Layer (b) are efficiently provided. Here, when two or more surfaces of the laminate are in contact with air or the like and are not in contact with the chemical solution, such as when the laminate is in the form of a sheet, the arbitrary surface that is in contact with air, etc. and is not in contact with the chemical solution is made outside, and the opposite side is made the inside. Also, when the laminate is a hollow laminate, the inside of the laminate means the side of the laminate that the chemical solution comes into contact with, and the outside means the side of the laminate that air, etc. comes into contact with and the chemical solution does not come into contact with.

In the laminate, it is preferable that Layer (a) and Layer (b) are adjacent to each other. According to this constitution, it is possible to obtain a laminate excellent in interlayer adhesiveness.

The laminate preferably consists of Layer (a) and Layer (b). According to this constitution, it is possible to efficiently exert the effects produced by Layer (a) and Layer (b). In this case, Layer (a) and Layer (b) may be one layer or two or more layers, respectively.

In the laminate, Layer (a) is more preferably arranged at the outermost layer of the laminate. By Layer (a) being arranged at the outermost layer, it is possible to obtain a laminate more excellent in bursting pressure strength at the time of high temperature. In the laminate, Layer (b) is more preferably arranged at the innermost layer of the laminate. By Layer (b) being arranged at the innermost layer, it is possible to further suppress lowering in mechanical properties due to contact with a chemical solution.

The laminate may have a further layer(s), which is one layer or two or more layers, other than the two layers of Layer (a) and Layer (b), in order to impart further functions or to obtain an economically advantageous laminate. As examples of such a further layer(s), there may be mentioned a layer containing the other thermoplastic resin and/or a layer of an arbitrary base material other than the thermoplastic resin. When the laminate contains a further layer(s), it is preferable that the innermost layer of the laminate contains the further layer(s). By the innermost layer of the laminate containing the further layer(s), a function by the further layer(s) can be efficiently imparted.

As the thermoplastic resins constituting the layer containing the other thermoplastic resin, there may be mentioned a polyamide-based resin, fluorine-containing polymer, polyester-based resin, polyether-based resin, polysulfone-based resin, polythioether-based resin, polyketone-based resin, polynitrile-based resin, poly methacrylate-based resin, polyvinylester-based resin, polyvinyl chloride-based resin, cellulose-based resin, polycarbonate-based resin, polyimide-based resin, thermoplastic polyurethane-based resin, etc.

Also, it is possible to laminate any base material other than the thermoplastic resin, for example, paper, metal-based material, non-stretched, uniaxially stretched or biaxially stretched plastic film or sheet, woven fabric, non-woven fabric, metal cotton, wood, etc. As the metal-based materials, there may be mentioned metals such as aluminum, iron, copper, nickel, gold, silver, titanium, molybdenum, magnesium, manganese, lead, tin, chromium, beryllium, tungsten, cobalt, etc., and/or a metal compound thereof; and alloys comprising two or more kinds thereof including alloy steel such as stainless steel, aluminum alloy, copper alloys such as brass, bronze, etc., nickel alloy, etc.

The number of the layers in total in the laminate is not particularly limited as long as the laminate has at least two layers having at least one layer of Layer (a) and at least one layer of Layer (b). The number of the layers in total in the laminate is preferably 8 layers or less judging from the mechanism of the apparatus for producing the laminate, and more preferably 2 layers or more and 7 layers or less. Also, it is particularly preferable that the number of the layers in total in the laminate is 2 layer from management of the materials and limitation of the molding manufacturing apparatus of the laminate.

The shape of the laminate is arbitrary, and may be a sheet shape or a hollow shape (a shape inside of which is hollow such as tubular, bottle-shaped, etc.). As the hollow shape, a tubular shape is preferable. The laminate may have a wave-like region. The wavelike region means a region formed in a wavelike shape, a bellows shape, an accordion shape, a corrugated shape, etc. The wavelike region is not limited to the one formed over the entire length of the laminate, but may be partially provided in an appropriate region in the middle of the laminate.

As specific embodiments of the laminate, there may be mentioned a laminated hollow molded body, a laminated film and a laminated plate, and a laminated hollow molded body is preferable. Also, as specific embodiments of the laminated hollow molded body, a laminated tube may be mentioned.

A thickness of Layer (a) in the laminate is preferably 30% or more and 95% or less based on the total wall thickness of the laminate, more preferably 40% or more and 85% or less, and particularly preferably 45% or more and 80% or less. By making the layer thickness of Layer (a) in the above-mentioned range, the above-mentioned each characteristic can be effectively exhibited.

A thickness of Layer (b) of the laminate is preferably exceeding 5% and less than 70% based on the total wall thickness of the laminate, more preferably exceeding 15% and less than 60%, and particularly preferably exceeding 20% and less than 55%. By making the layer thickness of Layer (b) in the above-mentioned range, the above-mentioned each characteristic can be effectively exhibited.

The total wall thickness of the laminate is preferably 0.5 mm or more and 25 mm or less.

When the laminate is a laminated tube, an outer diameter of the laminated tube is designed in order that, taking into consideration a flow amount of the circulating chemical solution and/or gas (for example, engine coolant), etc., the wall thickness is a thickness that does not increase permeability of the chemical solution and can maintain the bursting pressure of the usual tubes, and a thickness that can maintain flexibility to the extent that the operation to assemble the tube is easy and vibration resistance at the time of use of the tube is good, but it is not limited. It is preferable that the outer diameter is 4 mm or more and 300 mm or less, the inner diameter is 3 mm or more and 250 min or less, and the wall thickness is 0.5 mm or more and 25 min or less.

As methods for producing a laminate, there may be mentioned a method in which melt extrusion is carried out using extruders corresponding to the number of the layers or the number of the materials to simultaneously laminate inside or outside of the die (coextrusion molding method), or a method in which a single-layer tube or a laminate produced by the above-mentioned method is previously produced, and a resin(s) is/are successively integrated outside thereof using an adhesive, if necessary, to laminated the resin(s) (coating method). The laminate is preferably produced by a coextrusion method in which various kinds of materials are coextruded in a molten state, and both are heat-sealed (melt-bonded) to produce a tube having a laminated structure in one step. That is, the method for producing the laminate preferably contains to carry out coextrusion molding.

Also, when the laminate has a complicated shape or is subjected to heat bending after molding to obtain a molded product, it is also possible to obtain a target molded product by subjecting to a heat treatment at a temperature lower than the lowest melting point of the resins constituting the above-mentioned laminate for 0.01 hour or longer and 10 hours or shorter after forming the above-mentioned laminate to remove residual strain of the molded product.

A laminate having a wavelike region can be easily formed by first molding a straight tubular laminate and then molding it to obtain a predetermined wavelike shape, etc. By having such a wavelike region, the laminate has impact absorbing property and it can be easily attached. Further, for example, it is possible to add a necessary part such as a connector, or it can be made an L-shape, a U-shape, etc., by bending.

To all or part of the outer circumference of the laminate molded in this way, in consideration of stone splash, wear with other parts and flame resistance, there may be disposed a solid or sponge-like protective member (protector) constituted by natural rubber (NR), butadiene rubber (BR), isoprene rubber (IR), butyl rubber (IIR), chloroprene rubber (CR), carboxylated butadiene rubber (XBR), carboxylated chloroprene rubber (XCR), epichlorohydrin rubber (ECO), acrylonitrile-butadiene rubber (NBR), hydrogenated acrylonitrile-butadiene rubber (HNBR), carboxylated acrylonitrile-butadiene rubber (XNBR), a mixture of NBR and polyvinyl chloride, acrylonitrile-isoprene rubber (NIR), chlorinated polyethylene rubber (CM), chlorosulfonated polyethylene rubber (CSM), ethylene-propylene rubber (EPR), ethylene-propylene-diene rubber (EPDM), ethylene vinyl acetate rubber (EVM), mixed rubber of NBR and EPDM, acrylic rubber (ACM), ethylene acrylic rubber (AEM), acrylate butadiene rubber (ABR), styrene-butadiene rubber (SBR), carboxylated styrene-butadiene rubber (XSBR), styrene-isoprene rubber (SIR), styrene-isoprene-butadiene rubber (SIBR), urethane rubber, silicone rubber (MQ, VMQ), fluorine rubber (FKM, FFKM), fluorosilicone rubber (FVMQ), thermoplastic elastomers such as vinyl chloride-based, olefin-based, ester-based, urethane-based, amide-based, etc. The protective member may be a sponge-like porous body by a known manner. By making it a porous body, it is possible to form a protective portion having lightweight and excellent in heat insulating properties. Also, the material cost can be reduced. Or else, its strength may be improved by adding glass fiber, etc. A shape of the protective member is not particularly limited, and it is usually a tubular member, or a block-shaped member having a recess for receiving a laminated tube, which is one embodiment of the laminate. In the case of a tubular member, it can be prepared by inserting the laminated tube into the previously prepared tubular member later, or by coating and extruding a tubular member on the laminated tube to make them in close contact with each other. In order to adhere the both members, if necessary, an adhesive is coated on the inner surface of the protective member or the above-mentioned recess surface, a laminated tube is inserted or fitted therein, and the both members are brought into close contact to form a structure in which the laminated tube and the protective member are integrated. It is also possible to reinforce with metal, etc.

[Use of Laminate]

The laminate can be applied not only to mechanical parts such as automobile parts, internal combustion engine applications, power tool housings, etc., but also to various uses such as industrial materials, industrial stuff, electrical and electronic parts, medical use, foods, household and office supplies, building material-related parts, parts for furniture, etc.

Also, the laminate is excellent in preventing from permeation of chemical solutions, so that it can be suitably used as a chemical solution transportation tube. As the chemical solutions, there may be mentioned, for example, aromatic hydrocarbon solvents such as benzene, toluene, xylene, alkylbenzenes, etc.; alcohols such as methanol, ethanol, propanol, butanol, pentanol, ethylene glycol, propylene glycol, diethylene glycol, phenol, cresol, polyethylene glycol, polypropylene glycol, polyalkylene glycol, etc.; phenol solvents; ether solvents such as dimethyl ether, dipropyl ether, methyl-t-butyl ether, ethyl-t-butyl ether, dioxane, tetrahydrofuran, polyol esters, polyvinyl ethers, etc.; halo-olefins such as HFC-23, HFC-32, HFC-41, HFC-123, HFC-125, HFC-134, HFC-134a, HFC-143, HFC-143a, HFC-152, HFC-152a, HFC-161, HFC-227ea, HFC-227ca, HFC-236fa, HFC-236ea, HFC-236cb, HFC-236ca, HFC-245ca, HFC-245ea, HFC-245eb, HFC-245fa, HFC-245cb, HFC-254eb, HFC-254cb, HFC-254ca, HFC-263fb, HFC-263ca, HFC-272fb, HFC-272ea, HFC-272fa, HFC-272ca, HFC-281fa, HFC-281ea, HFC-329p, HFC-329mmz, HFC-338mf, HFC-338mcc, HFC-338pcc, HFC-347s, HFC-365mfc, HFC-4310mee, HFC-1123, HFC-1132a, FC-1216, HFC-1223, HFC-1225zc, HFC-1225ye, HFC-1225yc, HFC-1232xf, HFC-1234ye, HFC-1234ze, HFC-1234yf, HFC-1234yc, HFC-1234zc, HFC-1243yf, HFC-1243zc, HFC-1243ye, HFC-1243ze, HFC-1243zf, HFC-1243yc, HFC-1261yf, FC-1318my, FC-1318cy, HFC-1327my, HFC-1327ye, HFC-1327py, HFC-1327et, HFC-1327cz, HFC-1327cye, HFC-1327cyc, HFC-1336yf, HFC-1336ze, HFC-1336eye, HFC-1336eyc, HFC-1336pyy, HFC-1336pz, HFC-1336mzy, HFC-1336mzz, HFC-1336qc, HFC-1336pe, HFC-1336 ft, HFC-1345qz, HFC-1345mzy, HFC-1345fz, HFC-1345mzz, HFC-1345sy, HFC-1345fyc, HFC-1345pyz, HFC-1345cyc, HFC-1345pyy, HFC-1345eyc, HFC-1345ctm, HFC-1345ftp, HFC1345fye, HFC-1345eyf, HFC-1345eze, HFC-1345ezc, HFC-1345eye, HFC-1354fze, HFC-1354ctp, HFC-1354etm, HFC-1354tfp, HFC-1354my, HFC-1354mzy, FC-141-10myy, FC-141-10cy, HFC-1429mzt, HFC-1429myz, HFC-1429mzy, HFC-1429eyc, HFC-1429czc, HFC-1429cycc, HFC-1429pyy, HFC-1429myyc, HFC-1429myye, HFC-1429eyym, HFC-1429cyzm, HFC-1429mzt, HFC-1429czym, HFC-1438fy, HFC-1438eycc, HFC-1438ftmc, HFC-1438czzm, HFC-1438ezym, HFC-1438ctmf, HFC-1447fzy, HFC-1447fz, HFC-1447fycc, HFC-1447cz, HFC-1447mytm, HFC-1447fyz, HFC-1447ezz, HFC-1447qzt, HFC-1447syt, HFC-1456szt, HFC-1456szy, HFC-1456mstz, HFC-1456fzce, HFC-1456ftmf, FC-151-12c, FC-151-12mcy, FC-151-12mmtt, FC-151-12mmzz, HFC-152-11mmtz, HFC-152-11mmyyz, HFC-152-11mmyyz, HFC-1549fz (PFBE), HFC-1549fztmm, HFC-1549mmtts, HFC-1549fycz, HFC-1549myts, HFC-1549mzzz, HFC-1558szy, HFC-1558fzccc, HFC-1558mmtzc, HFC-1558ftmf, HFC-1567fts, HFC-1567szz, HFC-1567fzfc, HFC-1567sfyy, HFC-1567fzfy, HFC-1567myzzm, HFC-1567mmtyf, FC-161-14myy, FC-161-14mcyy, HFC-162-13mzy, HFC162-13myz, HFC-162-13mczy, HFC-162-13mcyz, CFC-11, CFC-114, CFC-114a, CFC-115, HCFC-21, HCFC-22, HCFC-122, HCFC-123, HCFC-124, HCFC-124a, HCFC-132, HCFC-133a, HCFC-141b, HCFC-142, HCFC-142b, HCFC-225ca, HCFC-225cb, HCFC-240db, HCFC-243db, HCFC-243ab, HCFC-244eb, HCFC-244bb, HCFC-244db, HCFC-1111, HCFC-1113, HCFC-1223xd, HCFC-1224xe, HCFC-1232xf, HCFC-1233xf, HCFC-1233zd, and a mixture thereof, etc.; ketone solvents such as acetone, methyl ethyl ketone, diethyl ketone, acetophenone, etc.; mineral oils, silicone oils, natural paraffins, naphthenes, synthetic paraffins, polyalphaolefins, etc., gasoline, kerosene, diesel gasoline, rapeseed oil methyl ester, soybean oil methyl ester, palm oil methyl ester, coconut oil methyl ester, gas liquefied oil (Gas To Liquid: GTL), coal liquefied oil (Coal To Liquid: CTL), biomass liquefied oil (Biomass To Liquid: BTL), alcohol-containing gasoline, ethyl-t-butyl ether blended oxygen-containing gasoline, amine-containing gasoline, sour gasoline, compressed natural gas (CNG), liquefied petroleum gas (LPG), liquefied hydrocarbon gas (LHG), liquefied natural gas (LNG), dimethyl ether (DME) for fuel, castor oil base brake liquid, glycol ether-based brake liquid, boric acid ester-based brake liquid, brake liquid for frigid region, silicone oil-based brake liquid, mineral oil-based brake liquid, power steering oil, hydrogen sulfide-containing oil, window washer liquid, engine coolant, urea solution, pharmaceutical agents, inks, paints, etc.

The laminate is suitable as a tube for transporting the above-mentioned chemical solution, and there may be specifically mentioned fuel tubes such as a feed tube, a return tube, an evaporator tube, a fuel filler tube, an ORVR tube, a reserve tube, a vent tube, etc., an oil tube, an oil drilling tube, a pneumatic or an oil pressure tube, a clutch tube, a brake tube, a brake negative pressure tube, a suspension tube, an air tube, a turbo air tube, an air duct tube, a blow-by tube, an EGR valve control tube, a tube for a window washer liquid, a cooler tube for a coolant (LLC), a reservoir tank tube, a urea solution transport tube, a tube for cooling or heating a battery, a tube for a fuel cell, a tube for an air conditioner, a heater tube, a radiator tube, a load heating tube, a floor heating tube, a tube for infrastructure supply, a tube for fire extinguishers and fire extinguishing equipment, a tube for cooling equipment for medical use, a tube for spreading an ink or a paint, and a tube for the other chemical solutions, and it is particularly preferably used as either of a cooler tube for a coolant (LLC), a urea solution transport tube, a tube for cooling or heating a battery and a tube for an air conditioner.

EXAMPLES

In the following, the present invention will be specifically explained by showing Examples and Comparative Examples, but the present invention is not limited to these. First, the analysis and the method for measuring physical properties in Examples and Comparative Examples, and the materials used in Example and Comparative Example are shown.

1. Characteristics of the polyolefin were measured by the following methods.

[Shore Hardness (D Scale)]

In accordance with ASTM D2240, a Shore hardness (D scale) was measured.

[Tensile Test]

In accordance with ASTM D638, a tensile yield point stress and a tensile break point stress were measured.

[MFR (Melt Flow Rate)]

In accordance with ASTM D1238, an MFR was measured under the conditions of 230° C. and 2,160 g.

[FT-IR]

Using FT/IR-4700 manufactured by JASCO, it was measured in the range from 4,000 $cm^{-1}$ to 650 $cm^{-1}$. Among the absorptions in the range of from 710 $cm^{-1}$ to 740 $cm^{-1}$, the value of the wave number showing the maximum intensity was examined.

2. Each physical property of the laminate was measured by the following methods.

[Low Temperature Impact Resistance]

With regard to ten laminated tubes, an impact test was carried out at −40° C. in accordance with the method described in SAE J 2260 7.5. Thereafter, presence or absence of breakage in the laminated tube was confirmed.

[High Temperature Bursting Pressure Strength]

With regard to five laminated tubes, a bursting pressure strength test was carried out by changing the test temperature to 125° C. in accordance with the method described in SAE J 2260 7.2. An average value of the measured bursting pressure strengths was shown in Table 1.

3. Materials used in Examples and Comparative Examples (1) Aliphatic Polyamide (A1)

[Production of Polyamide 12 (A1-1)]

A pressure-resistant reaction vessel having an inner volume of 70 liters and equipped with a stirrer was charged with 19.73 kg (100.0 mol) of dodecanelactam, 45.0 g (0.264 mol) of 5-amino-1,3,3-trimethylcyclohexanemethylamine and 0.5 L of distilled water, and after replacing the inside the polymerization tank with nitrogen, the mixture was heated to 180° C. and stirred at this temperature so that the inside of the reaction system became uniform. Then, the temperature inside the polymerization tank was raised to 270° C., and the mixture was polymerized for 2 hours under stirring while the pressure inside the tank was controlled to 3.5 MPa. Thereafter, the pressure was released to normal pressure (0.1 MPa) over about 2 hours, then, the pressure was reduced to 53 kPa, and polymerization was carried out under the reduced pressure for 5 hours. Then, nitrogen was introduced into the autoclave, and after the pressure was restored again to normal pressure, the product was extracted from the nozzle at the under portion of the reaction vessel as a strand and the strand was cut to obtain pellets. The pellets were dried under reduced pressure to obtain polyamide 12 having a relative viscosity of 2.20, a terminal amino group concentration of 48 μeq/g and a terminal carboxyl group concentration of 24 μeq/g (hereinafter this polyamide 12 is referred to as (A1-1).). A ratio of a number of methylene groups to a number of amide groups [$CH_2$]/[NHCO] of the polyamide 12 (A1-1) is 11.0, which satisfies 7.0 or more. Also, the terminal amino group concentration [A] (μeq/g) and the terminal carboxyl group concentration [B] (μeq/g) of the polyamide 12 (A1-1) satisfies [A]>[B]+5.

(2) Impact Resistant Agent (A2)

Maleic anhydride-modified ethylene/1-butene copolymer (A2-1) (available from Mitsui Chemicals Inc., TAFMER (Registered Trademark) MH5020, concentration of acid anhydride group: 100 μeq/g, Shore hardness (D scale): <20)

(3) Plasticizer (A3)

N-butylbenzenesulfonamide (A3-1) (available from Proviron, Proviplast (Registered Trademark) 024)

(4) Aliphatic Polyamide Composition (A)

[Production of Aliphatic Polyamide Composition (A-1)]

With polyamide 12 (A1-1) were previously mixed maleic anhydride-modified ethylene/1-butene copolymer (A2-1) as an impact resistant agent, N-butylbenzenesulfonamide (A3-1) as a plasticizer, triethylene glycol-bis[3-(3-t-butyl-5-methyl-4-hydroxyphenyl)propionate] (available from BASF Japan Ltd., IRGANOX (Registered Trademark) 245) as an antioxidant and tris(2,4-di-t-butylphenyl)phosphite (available from BASF Japan Ltd., IRGAFOS168) as a phosphorus-based processing stabilizer, the resultant mixture was supplied to a twin-screw melt-kneader (Type: TEX (Registered Trademark) 44 manufactured by The Japan Steel Works, LTD.), melt-kneaded at a cylinder temperature of 180° C. to 270° C., and after extruding a molten resin in a strand shape, this was introduced in a water tank, cooled, cut and vacuum dried to obtain pellets of an aliphatic polyamide composition (A-1) comprising 0.8 part by mass of the antioxidant and 0.2 part by mass of the phosphorus-based processing stabilizer based on a total 100 parts by mass of polyamide 12 (A1-1)/impact resistant agent (A2-1)/plasticizer (A3-1)=85.0/10.0/5.0 (% by mass).

(5) Modified Polyolefin (B)

Modified polyolefin (B-1) maleic anhydride-modified polypropylene (available from Mitsui Chemicals Inc., Admer (Registered Trademark) QF551, Shore hardness (D scale): 58, tensile yield point stress: 19 MPa, tensile break point stress: 31 MPa, MFR: 5.2 g/10 min, a wave number showing the maximum intensity among absorptions in a wave number of 710 cm$^{-1}$ or more and 740 cm$^{-1}$ or less in FT-IR measurement: 722.2 cm$^{-1}$)

Modified polyolefin (B-2) maleic anhydride-modified polypropylene (available from Mitsui Chemicals Inc., Admer (Registered Trademark) QB516, Shore hardness (D scale): 62, tensile yield point stress: 23 MPa, tensile break point stress: 25 MPa, MFR: 2.8 g/10 min, a wave number showing the maximum intensity among absorptions in a wave number of 710 cm$^{-1}$ or more and 740 cm$^{-1}$ or less in FT-IR measurement: 720.3 cm$^{-1}$)

Modified polyolefin (B-3) maleic anhydride-modified polypropylene (available from Mitsui Chemicals Inc., Admer (Registered Trademark) QF500, Shore hardness (D scale): 66, tensile yield point stress: 24 MPa, tensile break point stress: 38 MPa, MFR: 3.5 g/10 min, a wave number showing the maximum intensity among absorptions in a wave number of 710 cm$^{-1}$ or more and 740 cm$^{-1}$ or less in FT-IR measurement: 718.4 cm$^{-1}$)

Modified polyolefin (B-4) maleic anhydride-modified polypropylene (available from Mitsui Chemicals Inc., Admer (Registered Trademark) QB510, Shore hardness (D scale): 65, tensile yield point stress: 28 MPa, tensile break point stress: 33 MPa, MFR: 2.7 g/10 min)

Modified polyolefin (B-5) maleic anhydride-modified polypropylene (available from Mitsui Chemicals Inc., Admer (Registered Trademark) QB520E, Shore hardness (D scale): 64, tensile yield point stress: 24 MPa, tensile break point stress: 35 MPa, MFR: 1.8 g/10 min)

4. Production of Laminate

Example 1-1

Using the aliphatic polyamide composition (A-1) and the modified polyolefin (B-1) mentioned above, (A-1) was melted at an extrusion temperature of 270° C. and (B-1) was melted at an extrusion temperature of 220° C. separately by using PAL32 (manufactured by Maillefer Co., Ltd.) two-layer tubes molding machine, and the discharged molten resins were merged by an adaptor to form a laminated tubular body. Subsequently, it was cooled by a sizing die in which dimensions were controlled, and withdrawing was carried out to obtain a laminated tube having a layer constitution of (a)/(b)=0.80 mm/0.20 mm, an inner diameter of 6.0 mm and an outer diameter of 8.0 mm, wherein (a) was Layer (a) (the outermost layer) comprising (A-1) and (b) was Layer (b) (the innermost layer) comprising (B-1). Measurement results of physical properties of the laminated tube (that is, the results of high temperature bursting pressure strength with regard to five laminated tubes, and the test results of low temperature impact resistance with regard to ten laminated tubes) are shown in Table 1.

Example 1-2

A laminated tube having a layer constitution of (a)/(b)=0.65 mm/0.35 mm, an inner diameter of 6.0 mm and an outer diameter of 8.0 mm was obtained in the same manner as in Example 1-1 except for changing the thicknesses of the layers of Example 1-1. Measurement results of physical properties of the laminated tube are shown in Table 1.

Example 1-3

A laminated tube having a layer constitution of (a)/(b)=0.50 min/0.50 mm, an inner diameter of 6.0 mm and an outer diameter of 8.0 mm was obtained in the same manner as in Example 1-1 except for changing the thicknesses of the layers of Example 1-1. Measurement results of physical properties of the laminated tube are shown in Table 1.

Comparative Example 1-1

A laminated tube having the layer constitution shown in Table 1 was obtained in the same manner as in Example 1-1 except for changing the modified polyolefin (B-1) to (B-2) in Example 1-1. Measurement results of physical properties of the laminated tube are shown in Table 1.

Comparative Example 1-2

A laminated tube having the layer constitution shown in Table 1 was obtained in the same manner as in Example 1-2 except for changing the modified polyolefin (B-1) to (B-2) in Example 1-2. Measurement results of physical properties of the laminated tube are shown in Table 1.

Comparative Example 1-3

A laminated tube having the layer constitution shown in Table 1 was obtained in the same manner as in Example 1-3 except for changing the modified polyolefin (B-1) to (B-2) in Example 1-3. Measurement results of physical properties of the laminated tube are shown in Table 1.

Comparative Example 2-1

A laminated tube having the layer constitution shown in Table 1 was obtained in the same manner as in Example 1-1 except for changing the modified polyolefin (B-1) to (B-3) in Example 1-1. Measurement results of physical properties of the laminated tube are shown in Table 1.

Comparative Example 2-2

A laminated tube having the layer constitution shown in Table 1 was obtained in the same manner as in Example 1-2 except for changing the modified polyolefin (B-1) to (B-3) in Example 1-2. Measurement results of physical properties of the laminated tube are shown in Table 1.

Comparative Example 2-3

A laminated tube having the layer constitution shown in Table 1 was obtained in the same manner as in Example 1-3 except for changing the modified polyolefin (B-1) to (B-3) in Example 1-3. Measurement results of physical properties of the laminated tube are shown in Table 1.

Comparative Example 3-1

A laminated tube having the layer constitution shown in Table 1 was obtained in the same manner as in Example 1-1 except for changing the modified polyolefin (B-1) to (B-4)

in Example 1-1. Measurement results of physical properties of the laminated tube are shown in Table 1.

Comparative Example 3-2

A laminated tube having the layer constitution shown in Table 1 was obtained in the same manner as in Example 1-2 except for changing the modified polyolefin (B-1) to (B-4) in Example 1-2. Measurement results of physical properties of the laminated tube are shown in Table 1.

Comparative Example 3-3

A laminated tube having the layer constitution shown in Table 1 was obtained in the same manner as in Example 1-3 except for changing the modified polyolefin (B-1) to (B-4) in Example 1-3. Measurement results of physical properties of the laminated tube are shown in Table 1.

Comparative Example 4-1

A laminated tube having the layer constitution shown in Table 1 was obtained in the same manner as in Example 1-1 except for changing the modified polyolefin (B-1) to (B-5) in Example 1-1. Measurement results of physical properties of the laminated tube are shown in Table 1.

Comparative Example 4-2

A laminated tube having the layer constitution shown in Table 1 was obtained in the same manner as in Example 1-2 except for changing the modified polyolefin (B-1) to (B-5) in Example 1-2. Measurement results of physical properties of the laminated tube are shown in Table 1.

Comparative Example 4-3

A laminated tube having the layer constitution shown in Table 1 was obtained in the same manner as in Example 1-3 except for changing the modified polyolefin (B-1) to (B-5) in Example 1-3. Measurement results of physical properties of the laminated tube are shown in Table 1.

Table 1

| | Outermost layer | | Innermost layer | | | Low temperature impact resistance (Number of broken tubes/number of tested tubes) | High temperature bursting pressure strength (125° C.) [MPa] |
|---|---|---|---|---|---|---|---|
| | Kind | Thickness [mm] | Kind | Shore hardness | Thickness [mm] | | |
| Example 1-1 | A-1 | 0.80 | B-1 | 58 | 0.20 | 0/10 | 1.7 |
| Example 1-2 | A-1 | 0.65 | B-1 | 58 | 0.35 | 0/10 | 1.4 |
| Example 1-3 | A-1 | 0.50 | B-1 | 58 | 0.50 | 0/10 | 1.1 |
| Comparative Example 1-1 | A-1 | 0.80 | B-2 | 62 | 0.20 | 10/10 | 1.6 |
| Comparative Example 1-2 | A-1 | 0.65 | B-2 | 62 | 0.35 | 10/10 | 1.4 |
| Comparative Example 1-3 | A-1 | 0.50 | B-2 | 62 | 0.50 | 10/10 | 1.2 |
| Comparative Example 2-1 | A-1 | 0.80 | B-3 | 66 | 0.20 | 7/10 | 1.3 |
| Comparative Example 2-2 | A-1 | 0.65 | B-3 | 66 | 0.35 | 10/10 | 1.1 |
| Comparative Example 2-3 | A-1 | 0.50 | B-3 | 66 | 0.50 | 10/10 | 0.8 |
| Comparative Example 3-1 | A-1 | 0.80 | B-4 | 65 | 0.20 | 1/10 | 1.5 |
| Comparative Example 3-2 | A-1 | 0.65 | B-4 | 65 | 0.35 | 10/10 | 1.0 |
| Comparative Example 3-3 | A-1 | 0.50 | B-4 | 65 | 0.50 | 10/10 | 0.8 |
| Comparative Example 4-1 | A-1 | 0.80 | B-5 | 64 | 0.20 | 0/10 | 1.3 |
| Comparative Example 4-2 | A-1 | 0.65 | B-5 | 64 | 0.35 | 6/10 | 1.2 |
| Comparative Example 4-3 | A-1 | 0.50 | B-5 | 64 | 0.50 | 7/10 | 0.9 |

From Table 1, it can be understood that the laminated tubes of Examples are excellent in low temperature impact resistance and bursting pressure strength at the time of high temperature even when the layer of the modified polyolefin becomes thick.

The invention claimed is:

1. A laminate having two or more layers comprising Layer (a) and Layer (b),
   the Layer (a) contains an aliphatic polyamide composition (A),
   the Layer (b) contains a modified polyolefin (B),
   the modified polyolefin (B) is a maleic anhydride-modified polpropylene, the modified polyolefin (B) has a Shore hardness (D scale) measured in accordance with ASTM D2240 of 30 or more and 61 or less, the aliphatic polyamide composition (A) contains a polyamide (A1), an impact resistant agent and a plasticizer, the polyamide (A1) is polyamide 11, polyamide 12, or polyamide 610, the impact resistant agent is an elastomer polymer which has a constitutional unit derived from an unsaturated compound having a carboxyl group and/or an acid anhydride group, and has a Shore hardness (D scale) measured in accordance with ASTM D2240 of less than 30, and a content of the impact resistant agent in the aliphatic polyamide composition (A) is 5% by mass or more and 30% by mass or less based on 100% by mass of the aliphatic polyamide composition (A), a content of the plasticizer in the aliphatic polyamide composition (A) is 1% by mass or more and 10% by mass or less based on 100% by mass of the aliphatic polyamide composition (A), a thickness of Layer (a) in the laminate is 50% or more and 95% or less based on the total wall thickness of the laminate, a thickness of Laver (b) in the laminate is 5% or more and 50% or less based on the total wall thickness of the laminate, and the total wall thickness of the laminate is 0.5 mm or more and 25 mm or less.

2. The laminate according to claim 1, wherein the aliphatic polyamide composition (A) further contains a heat resistant agent, and a content of the heat resistant agent in the aliphatic polyamide composition (A) is 0.5% by mass or more and 2% by mass or less based on 100% by mass of the aliphatic polyamide composition (A).

3. The laminate according to claim 1, wherein the Layer (a) and the Layer (b) are adjacent to each other.

4. The laminate according to claim 1, wherein the modified polyolefin (B) has a tensile yield point stress measured in accordance with ASTM D638 of 23 MPa or less, and a tensile break point stress measured in accordance with ASTM D638 of 25 MPa or more.

5. The laminate according to claim 1, wherein the modified polyolefin (B) has an MFR at 230° C. and 2,160 g measured in accordance with ASTM D1238 of 3.5 g/10 min or more.

6. The laminate according to claim 1, wherein the modified polyolefin (B) has a wave number showing the maximum intensity of 721 $cm^{-1}$ or more among absorptions in a wave number of 710 $cm^{-1}$ or more and 740 $cm^{-1}$ or less in FT-IR measurement.

7. The laminate according to claim 1, wherein the modified polyolefin (B) is produced by a method in which a polyolefin before modification is melted, the unsaturated compound having a functional group is added thereto, and the resultant mixture is subjected to graft copolymerization.

8. The laminate according to claim 1, which consists of the Layer (a) and the Layer (b).

9. The laminate according to claim 1, wherein it is produced by coextrusion molding.

10. The laminate according to claim 1, wherein the polyamide (A1) is polyamide 12.

11. The laminate according to claim 1, wherein a thickness of Layer (a) in the laminate is 65% or more and 95% or less based on the total wall thickness of the laminate, and a thickness of Layer (b) in the laminate is 5% or more and 35% or less based on the total wall thickness of the laminate.

12. A laminate hollow molded body comprising the laminate according to claim 1.

13. The laminated hollow molded body according to claim 12, wherein the Layer (a) and the Layer (b) are arranged in this order from the outside.

14. The laminated hollow molded body according to claim 13, wherein the Layer (b) is arranged at the innermost layer.

15. The laminated hollow molded body according to claim 12, wherein the innermost layer contains a further layer.

16. The laminated hollow molded body according to claim 12, wherein it is a tube.

* * * * *